United States Patent

Nishida et al.

[11] Patent Number: 5,824,428
[45] Date of Patent: Oct. 20, 1998

[54] FUEL CELL

[75] Inventors: Koji Nishida, Anjo; Daisuke Yamada, Toyota; Taku Matsutani, Toyama Pref, all of Japan

[73] Assignee: Aisin Seiki Kabushiki Kaisha, Kariya, Japan

[21] Appl. No.: 549,202

[22] Filed: Oct. 27, 1995

[30] Foreign Application Priority Data

Oct. 27, 1994 [JP] Japan ..................... 6-264271

[51] Int. Cl.$^6$ ...................... H01M 8/04
[52] U.S. Cl. ............... 429/26; 429/30; 429/38; 429/39
[58] Field of Search .............. 429/30, 34, 38, 429/39, 26

[56] References Cited

U.S. PATENT DOCUMENTS

| | | | |
|---|---|---|---|
| 4,686,159 | 8/1987 | Miyoshi | 429/39 |
| 4,997,726 | 3/1991 | Ariyama et al. | 429/32 |
| 5,108,849 | 4/1992 | Watkins et al. | 429/30 |
| 5,145,754 | 9/1992 | Misawa et al. | 429/34 X |
| 5,186,806 | 2/1993 | Clark et al. | 429/30 X |
| 5,213,910 | 5/1993 | Yamada | 429/39 X |
| 5,419,980 | 5/1995 | Okamoto et al. | |

FOREIGN PATENT DOCUMENTS

| | | |
|---|---|---|
| 0 395 975 | 11/1990 | European Pat. Off. |
| 0 406 523 | 1/1991 | European Pat. Off. |
| 0 629 015 | 12/1994 | European Pat. Off. |
| 43 14 745 | 12/1994 | Germany |
| 43 29 819 | 2/1995 | Germany |
| 195 23 317 | 1/1996 | Germany |
| 2-37669 | 2/1990 | Japan |

Primary Examiner—Anthony Skapars
Attorney, Agent, or Firm—Burns, Doane, Swecker & Mathis, LLP

[57] ABSTRACT

A fuel cell includes a sheet-shaped solid electrolyte which exhibits ion conductivity, a fuel electrode to which is supplied fuel functioning as a negative electrode active material, and an oxygen electrode to which is supplied oxygen functioning as a positive electrode active material. The fuel electrode is positioned on one surface of the solid electrolyte while the oxygen electrode is positioned on the opposite surface of the solid electrolyte. A fuel electrode electricity collector has a plurality of first projection portions that contact the surface of the fuel electrode that faces away from the solid electrolyte. As a result, a plurality of fuel passages are formed through which fuel is to be passed. An oxygen electrode electricity collector has a plurality of second projecting portions that contact the surface of the oxygen electrode facing away from these solid electrolyte. As a result, a plurality of oxygen passages are formed through which oxygen is to be passed. At least one of the first projecting portions or one of the second projecting portions is provided with a curved portion. This results in an improvement in the electrical collectability of the fuel cell.

11 Claims, 9 Drawing Sheets

FUEL CELL

FIELD OF THE INVENTION

The present invention relates to a fuel cell and more particularly to a fuel cell having a plate-shaped electrolyte to which is laminated a fuel electrode and an oxygen electrode, with fuel passages and oxygen passages being provided on opposite sides of the laminated structure.

BACKGROUND OF THE INVENTION

Figure 14:
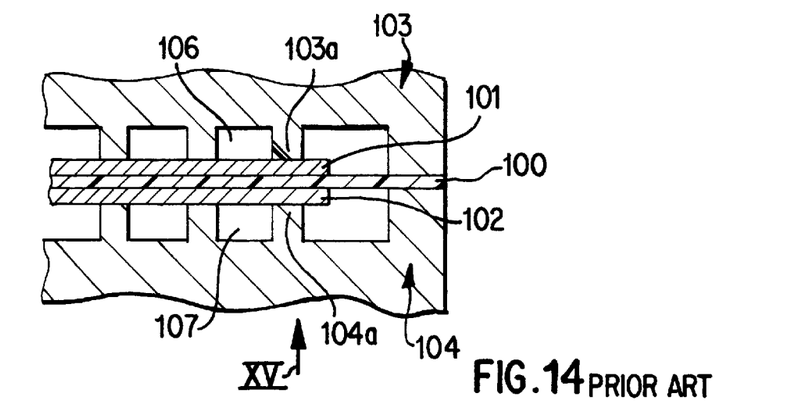
FIG. 14 is a cross-sectional view of major portions of a conventional polymer-film type fuel cell.

FIG. 14 illustrates a known polymer-film type fuel cell that utilizes hydrogen as the fuel. As shown in FIG. 14, the polymer-film type fuel cell includes a polymer film 100 that exhibits ionic conductivity, a fuel electrode 101 laminated on the polymer film 100 so that one of the surfaces of the fuel electrode 101 face one of the surfaces of the polymer film 100, and an oxygen electrode 102 laminated on the polymer film 100 so that one of the surfaces of the oxygen electrode 102 face the other surface of the polymer film 100. A fuel electrode electricity collector plate 103 contacts the outer surface of the fuel electrode 101 that is opposite the surface which is laminated to the polymer film 100, while an oxygen electrode electricity collector plate 104 contacts the outer surface of the oxygen electrode 102 that is opposite the surface which is laminated to the polymer film 100.

Figure 16:
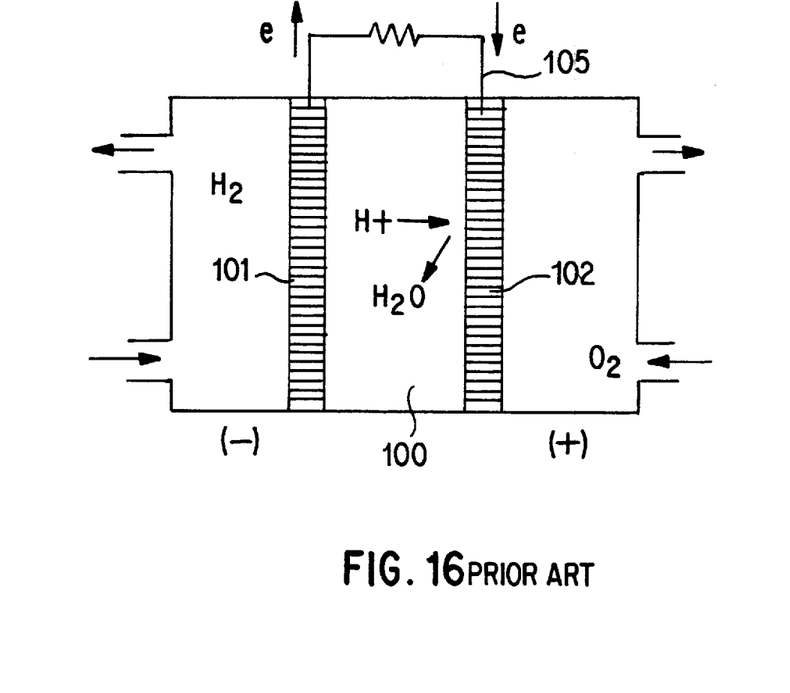
FIG. 16 is a diagram of a conventional polymer-film type fuel cell, illustrating the operating principle.

FIG. 16 shows the principle of the polymer-film type fuel cell. The fuel electrode 101 is provided with hydrogen and the oxygen electrode is provided with oxygen. Then, at the fuel electrode 101, a reaction (e.g., $H2 \rightarrow 2H^+ + 2e^-$) occurs. The hydrogen ions $H^+$ produced by this reaction pass through the polymer film 100 to arrive at the oxygen electrode 102. The electron e - produced by the reaction arrives at the oxygen electrode 102 by way of a connector wire 105. As a result, at the oxygen electrode 104, a reaction (e.g., $2H^+ + (\frac{1}{2})O_2 + 2e^- \rightarrow H_2$) occurs. Thus, this fuel cell functions as a battery because it produces e - to generate electric current.

As shown in FIG. 14, the fuel electrode electricity collector plate 103 has a plurality of first projecting portions 103a. The first projecting portions 103a contact the surface of the fuel electrode 101 opposite the surface which is against the polymer film 100. As a result, a plurality of fuel passages 106 are formed for passing fuel therein. The fuel passages 106 are defined by the space enclosed between the fuel electrode 101, the fuel electrode electricity collector plate 103 and two neighboring first projecting portions 103a. Also, the oxygen electrode electricity collector plate 104 has a plurality of second projecting portions 104a. The second projecting portions 104a contact the surface of the oxygen electrode 104 that is opposite the surface which contacts the polymer film 100. As a result, a plurality of oxygen passages 107 are formed for passing oxygen therein. The oxygen passages 17 are defined by the space enclosed by the oxygen electrode 102, the oxygen electrode electricity collector plate 104 and two neighboring second projecting portions 104a.

Figure 15:
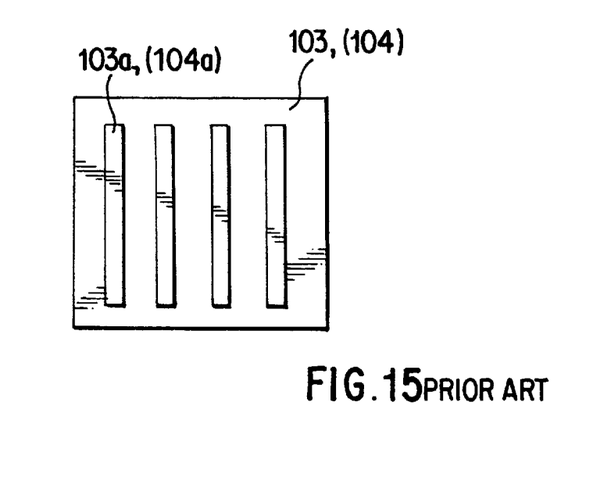
FIG. 15 is a perspective view of the fuel cell as viewed in the direction of arrow XV—XV in FIG. 14.

As shown in FIG. 14, the fuel electrode electricity collector plate 103 is pressed toward the fuel electrode 101, and the oxygen electrode electricity collector plate 104 is pressed toward the oxygen electrode 102. Thus, the top surfaces of the first projecting portions 103a are connected to the fuel electrode and the top surfaces of the second projecting portions 104a are connected to the oxygen electrode 102. Also, as shown in FIG. 15, the first projecting portions 103a are disposed parallel with each other and the second projecting portions 104a are disposed parallel with each other. In addition, both the first and second projecting portions 103a, 104a are bar-like in shape.

The conventional fuel cell described above is problematic in that electrical contact between the fuel electrode electricity collector plate 103 (oxygen electrode electricity collector 104) and the fuel electrode 101 (oxygen electrode 102) is bad because the fuel electrode 101 (oxygen electrode 102) is in contact with only the top surfaces of the first projecting portions 103a (second projecting portions 104a). Thus, the electrical resistance between the electrode and the electricity collector plate is somewhat large.

Further, the contacting area at which the electrode contacts the electricity collector plate is smaller because the first and second projecting portions 103a, 104a possess a linear bar-like shape. Thus, the electrical resistance between the electrode and the electricity collector plate is much larger.

SUMMARY OF THE INVENTION

In view of the foregoing, it would be desirable to provide a fuel cell which does not suffer from the above-described disadvantages and drawbacks.

More particularly, a need exists for a fuel cell constructed so that the contacting area at which the electrode contacts the electricity collector plate is larger so that the electrical resistance between the electrode and the electricity collector plate is smaller.

In accordance with an aspect of the present invention, a fuel cell includes a sheet-shaped solid electrolyte that has opposite surfaces and exhibits ion conductivity. A fuel electrode to which fuel working as a negative electrode active material is supplied is disposed on one of the opposite surfaces of the solid electrolyte so that one of the surfaces of the fuel electrode faces one of the surfaces of the solid electrolyte. An oxygen electrode to which oxygen working as a positive electrode active material is supplied is disposed on the opposite side of the solid electrolyte so that one of the opposite surfaces of the oxygen electrode faces the opposite surface of the solid electrode. A fuel electrode electricity collector plate has a plurality of first projecting portions which contact the surface of the fuel electrode opposite the solid electrolyte, and an oxygen electrode electricity collector plate has a plurality of second projecting portions which contact the surface of the oxygen electrode opposite the solid electrolyte. A plurality of fuel passages through which fuel is to be passed are each defined by the space enclosed between the fuel electrode, the fuel electrode electricity collector plate and two neighboring first projecting portions. A plurality of oxygen passages through which oxygen is to be passed are also provided. The oxygen passages are each defined by the space enclosed between the oxygen electrode, the oxygen electrode electricity collector plate and two neighboring second projecting portions. At least one of said first projecting portions and said second projecting portions has a curved portion.

Since at least one of the first projecting portions and the second projecting portions is curved the length of the projecting portions in the length-wise direction is longer. Thus, the contacting area at which the electrode contacts the electricity collector plate is much larger and the electrical resistance between the electrode and electricity collector plate is much smaller, thereby resulting in an improvement in efficiency with respect to collecting electricity.

It is preferable that both the first projecting portions and the second projecting portions possess a wave-like shape. Also, at least one of the first projecting portions or at least one of the second projecting portions intrude into the electrode face since all portions intruded on the electrode contact the electrode. Thus, the contacting area between the electricity collector plate and the electrode is much larger than in the case of a conventional fuel cell described above. As a result, the electrical resistance between the electrode and the electricity collector plate is much smaller, thereby also improving the efficiency with respect to electricity collectability.

It is preferable that both of the first projecting portions and the second projecting portions intrude into the electrode face. Also, it is preferable that both the first projecting portions and the second projecting portions possess a wave-like shape.

According to another aspect of the invention, a fuel cell includes a plate-shaped solid electrolyte which has first and second opposite surfaces and which exhibits ion conductivity, a fuel electrode to which is to be supplied fuel working as a negative electrode active material, and an oxygen electrode to which is to be supplied oxygen working as a positive electrode active material. The fuel electrode has first and second opposite surfaces and is disposed so that the first surface of the fuel electrode faces the first surface of solid electrolyte. The oxygen electrode has first and second opposite surfaces and is disposed so that the first surface of the oxygen electrode faces the second surface of the solid electrode. A fuel electrode electricity collector is positioned in facing relation to the fuel electrode and an oxygen electrode electricity collector is positioned in facing relation to the oxygen electrode. The fuel cell includes at least one fuel passage is provided through which fuel is to be passed, and at least one oxygen passage through which oxygen is to be passed. The fuel passage is defined by a space that is bounded by the fuel electrode, the fuel electrode electricity collector and two first projecting portions extending from the fuel electrode electricity collector towards the fuel electrode. The oxygen passage is defined by a space that is bounded by the oxygen electrode, the oxygen electrode electricity collector and two second projecting portions extending from the oxygen electrode electricity collector towards the oxygen electrode. At least one of the oxygen passage and the fuel passage has a non-linear shape to provide a non-linear fluid flow path.

In accordance with another aspect of the invention, a fuel cell includes a plate-shaped solid electrolyte which has first and second opposite surfaces and which exhibits ion conductivity, a fuel electrode to which is to be supplied fuel working as a negative electrode active material, and an oxygen electrode to which is to be supplied oxygen working as a positive electrode active material. The fuel electrode has first and second opposite surfaces and is disposed on the first surface of the solid electrolyte so that the first surface of the fuel electrode faces the first surface of the solid electrolyte. The oxygen electrode has first and second opposite surfaces and is disposed on the surface of the solid electrolyte so that the first surface of the oxygen electrode faces the second surface of the solid electrode. The cell also includes a fuel electrode electricity collector and an oxygen electrode electricity collector. At least two first projecting portions extend from the fuel electrode electricity collector and contact the fuel electrode to define a fuel passage through which fuel is to be passed. At least two second projecting portions extend from the oxygen electrode electricity collector and contact the oxygen electrode to define an oxygen passage through which oxygen is to be passed. The first and second projecting portions are positioned such that: 1) the distal end of at least one of the first projecting portions penetrates and extends below the second surface of the fuel electrode; or 2) the distal end of at least one of the second projecting portions penetrates or extends below the second surface of the oxygen electrode. This results in an improvement in efficiency with respect to electricity collectability.

BRIEF DESCRIPTION OF THE DRAWING FIGURES

Additional features and advantages of the present invention will become more apparent from the following detailed description of the preferred embodiments when considered with reference to the attached drawing figures in which like elements bear like reference numerals and wherein.

DETAILED DESCRIPTION OF THE PREFERRED EMBODIMENT

The embodiments of the present invention hereinafter described are applicable at least to polymer-film type fuel cells which operate with hydrogen as fuel, and the following description is set forth in that context.

Figure 1:
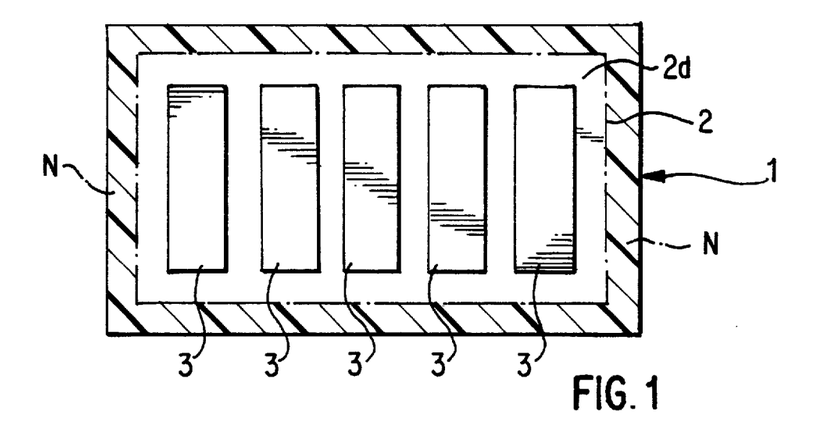
FIG. 1 is a plan view of a polymer film on which fuel electrodes are disposed.
Figure 2:
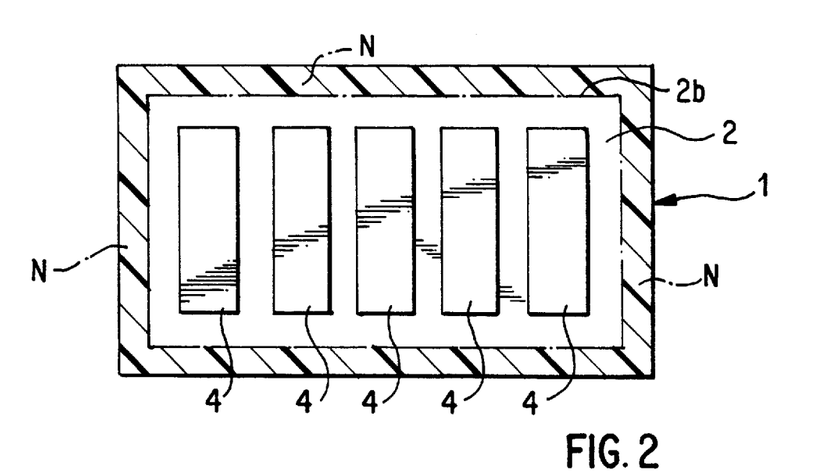
FIG. 2 is a plan view of a polymer film on which oxygen electrodes are disposed.
Figure 3:
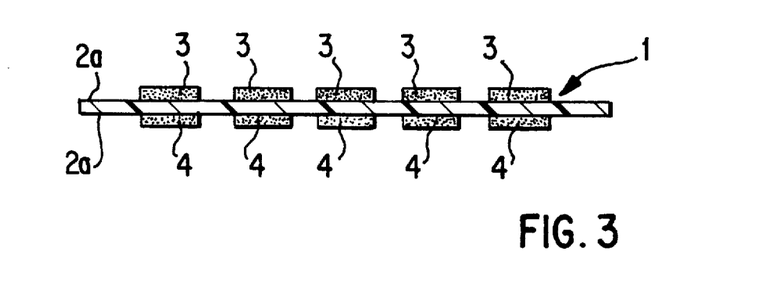
FIG. 3 is a cross-sectional view of the polymer film on which the fuel electrodes and the oxygen electrodes are disposed.

With reference to FIG. 1 through FIG. 3, a polymer-film type fuel cell is provided with a relatively thin sheet-shaped or plate-shaped polymer film 2 which operates as a solid electrolyte capable of transferring hydrogen ions H+ therethrough. The polymer film 2 can, for example, be formed of a cation-exchange resin film (e.g., SPE: Solid Polymer Electrolyte). As illustrated in FIG. 1, on one of the outer surfaces (e.g., surface 2a) of the polymer film 2, there are bonded five fuel electrodes 3 adjacent to each other. The fuel electrodes 3 operate as a negative electrode. Hydrogen as fuel which works as a negative electrode active material is supplied to the fuel electrodes 3.

On the opposite outer surface (e.g., surface 2b) of the polymer film 2, there are bonded five oxygen electrodes 4 adjacent to each other. The oxygen electrodes 4 operate as a positive electrode. Air is supplied to the oxygen electrodes 4 and the air includes oxygen which works as a positive electrode material. The oxygen electrodes 4 and the fuel electrodes 3 are, for example, carbon-based electrodes having porosity.

Figure 4:
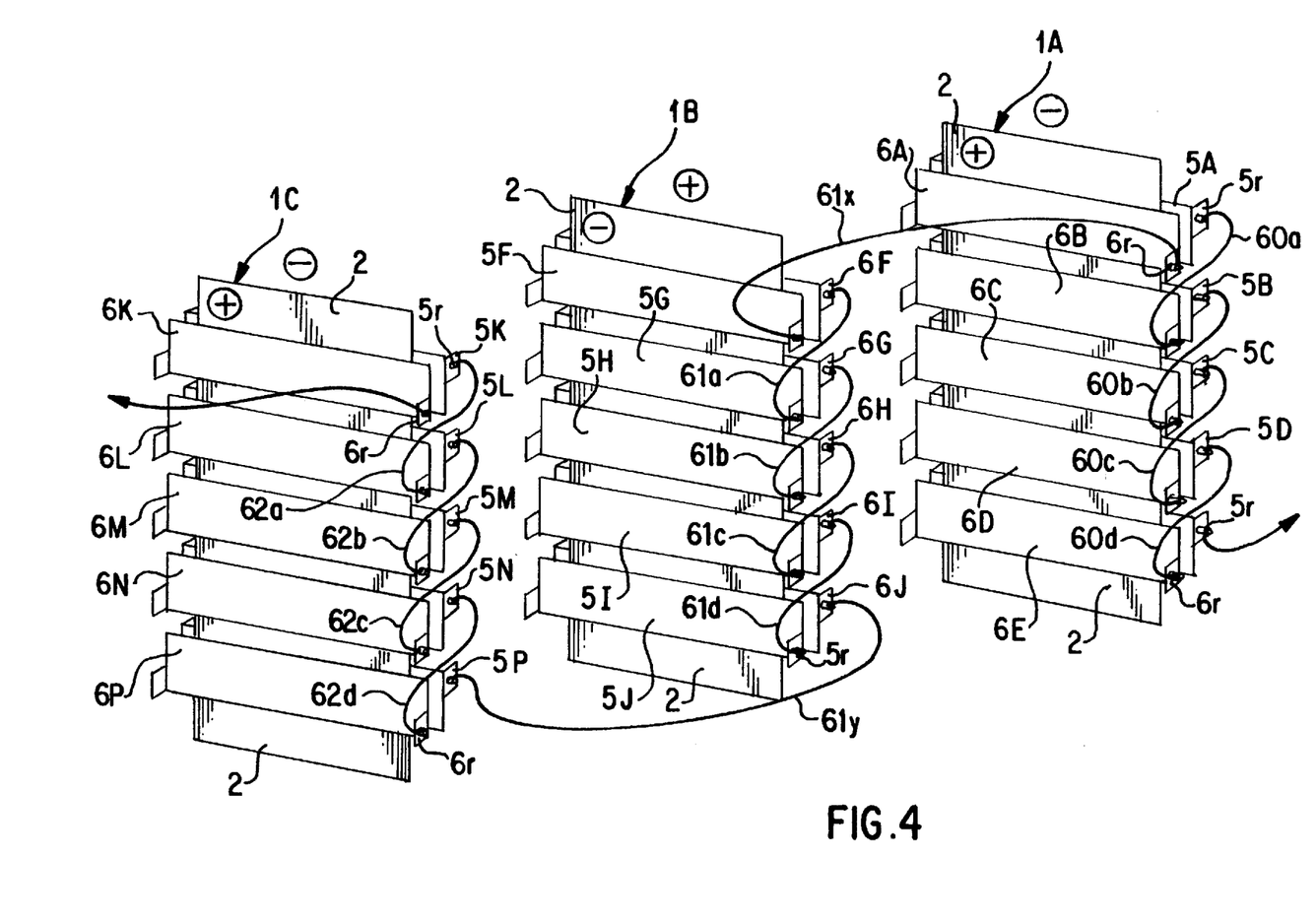
FIG. 4 is a schematic perspective view of major portions of the present fuel cell, and illustrates how the fuel electrodes and the oxygen electrodes are connected electrically in series.

FIG. 4 schematically illustrates major portions of the present fuel cell with the laminated cells 1A, 1B, and 1C depicted in an exploded view. On the other hand, FIG. 6 schematically illustrates major portions of the fuel cell whose cells 1A, 1B and so on, are laminated.

Figure 6:
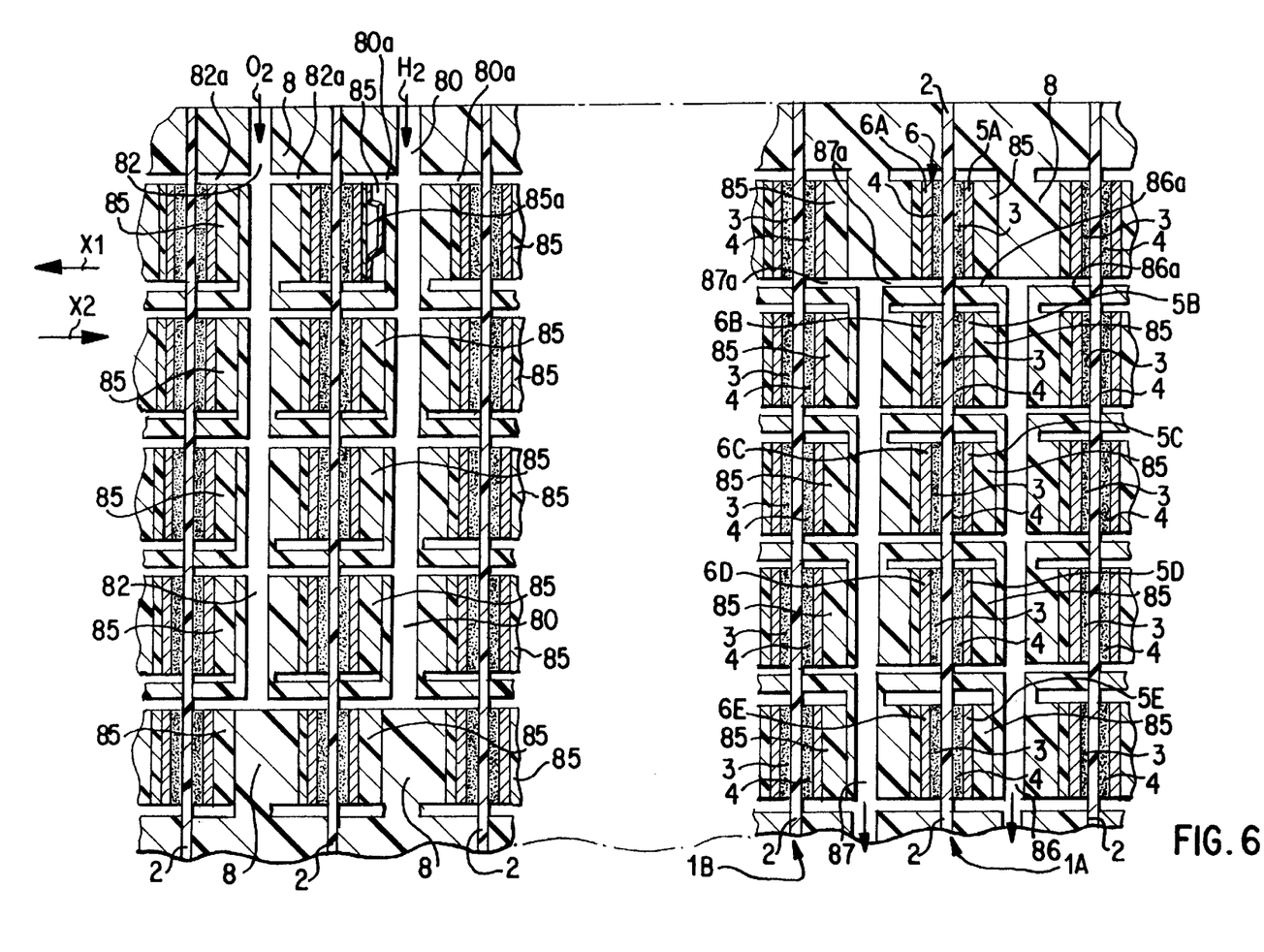
FIG. 6 is a schematic cross-sectional view of major portions of the present fuel cell.

As illustrated in FIG. 6, five fuel electrode electricity collector plates 5 (e.g., 5A, 5B, 5C, 5D and 5E) are disposed and laminated respectively on one outer side surface against the polymer film 2 of the five fuel electrodes 3 in the cell 1A. Further, as illustrated in FIG. 6, five oxygen electrode electricity collector plates 6 (e.g., 6A, 6B, 6C, 6D and 6E) are disposed and laminated respectively on one outer side surface against the polymer film 2 of the five oxygen electrodes 4 in the cell 1A. The fuel electrode electricity collector plates 5 and the oxygen electrode electricity collector plates 6 possess a rectangular shape and are made of copper.

In the cell 1A, the fuel electrodes 3, disposed adjacent to each other on one of the outer surfaces of the polymer film 2, are connected electrically in series with the oxygen electrodes 4, disposed adjacent to each other on the other outer surface of the polymer film 2. Likewise, in another cell 1, the fuel electrodes 3 are connected electrically in series with the oxygen electrodes 4.

FIG. 4 illustrates how the fuel electrodes 3 are connected electrically in series with the oxygen electrodes 4. First, the electrical connection in the cell 1A on the right-hand side of FIG. 4 will be described in detail. In the cell 1A, the fuel electrode electricity collector plate 5A is electrically connected with the oxygen electrode electricity collector plate 6B by a conductive wire 60a. The fuel electrode electricity collector plate 5B of the cell 1A is electrically connected with the oxygen electrode electricity collector plate 6C of the cell 1A by a conductive wire 60b. The fuel electrode electricity collector plate 5C of the cell 1A is electrically connected with the oxygen electrode electricity collector plate 6D of the cell 1A by a conductive wire 60c. The fuel electrode electricity collector plate 5D of the cell IA is electrically connected with the oxygen electrode electricity collector plate 6E of the cell IA by a conductive wire 60d. Thus, in the cell 1A, the different electrodes are electrically connected with each other in series.

The electrical connection in the cell 1B in the middle of FIG. 4 will be described in detail. In the middle cell 1B, the fuel electrode electricity collector plate 5F is electrically connected with the oxygen electrode electricity collector plate 6A of the cell 1A, which is disposed to neighbor on the cell 1B, by a conductive wire 61x. The fuel electrode electricity collector plate 5G of the cell 1B is electrically connected with the oxygen electrode electricity collector plate 6F of the cell 1B by a conductive wire 61a. The fuel electrode electricity collector plate 5H of the cell 1B is electrically connected with the oxygen electrode electricity collector plate 6G of the cell 1B by a conductive wire 61b. The fuel electrode electricity collector plate 5I of the cell 1B is electrically connected with the oxygen electrode electricity collector plate 61 of the cell 1B by a conductive wire 61c. The fuel electrode electricity collector plate 5J of the cell 1B is electrically connected with the oxygen electrode electricity collector plate 61 of the cell 1B by a conductive wire 61d. Thus, in the cell 1B, the different electrodes are electrically connected with each other in series.

Further, with respect to the electric connection in the cell 1C on the left hand side of FIG. 4, the fuel electrode electricity collector plates 5K, 5L, 5M, 5N of the cell 1C are respectively electrically connected with the oxygen electrode electricity collector plates 6L, 6M, 6N, 6P of the cell 1C by respective conductive wires 62a, 62b, 62c, 62d. The fuel electrode electricity collector plate 5P of the cell 1C is electrically connected with the oxygen electrode electricity collector plate 6J of the cell 1B, which is disposed to neighbor on the cell 1C, by a conductive wire 61y. Thus, in the cell 1C, the different electrodes are electrically connected with each other in series.

As shown in FIG. 4, a projection lug 5r is formed at an end of each fuel electrode electricity collector plate 5 in the length-wise direction of the plates. Similarly, a projection lug 6r is formed at an end of each oxygen electrode electricity collector plate 6 in the length wise direction of the plates. The conductive wires are connected to the fuel electrode electricity collector plates 5 and the oxygen electrode electricity collector plates 6 by means of the projection lugs 5r, 6r.

By thus carrying out the connection in each of the cells 1, the fuel electrode electricity collector plates 5 for the fuel electrodes 3, which are disposed on one of the surfaces of the polymer film 2, are connected electrically in series with the oxygen electrode electricity collector plates 6 for the oxygen electrodes 4, which are disposed on the opposite outer surface of the polymer film 2.

Figure 5:
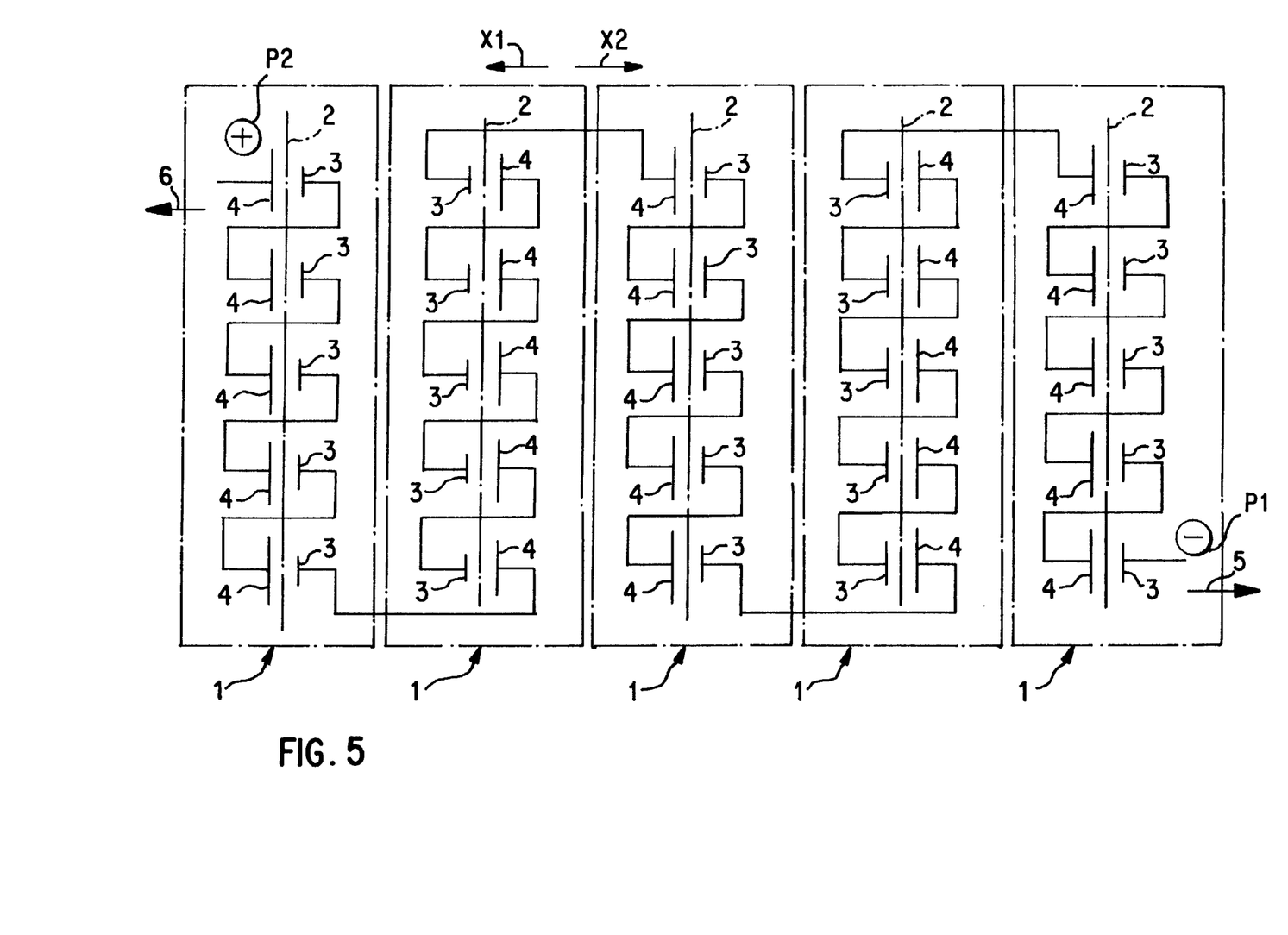
FIG. 5 is a construction diagram illustrating how the fuel electrodes and the oxygen electrodes in the fuel cell of the present invention are electrically connected in series.

FIG. 5 schematically illustrates how the electric connection is established in this embodiment. In FIG. 5, an overall negative electrode of the embodiment is designated at "P1" and is constituted by one of the fuel electrodes 3 and one of the fuel electrode electricity collector plates 5 which are adapted to be a take-out port. Also in FIG. 5, an overall positive electrode of the embodiment is designated at "P2" and is constituted by one of the oxygen electrodes 4 and one of the oxygen electrode electricity collector plates 6 which are adapted to be a take-out port.

This embodiment is built by laminating a plurality of the thus constructed cells 1 in their thickness-wise directions (i.e., the directions "X1" and "X2" of FIG. 5). The number of laminated cells 1 can be determined as desired. For instance, the cells 1 can be laminated in tens or hundreds. In FIG. 5, the cells 1 are laminated with the illustrated predetermined number for purposes of facilitating an understanding of the present invention.

When a plurality of the cells 1 are laminated, a polymer-film type fuel cell can further advantageously produce an increased voltage output. Namely, even if the cell is downsized, it can produce an enlarged voltage output, for example, hundreds of volts or more.

In this embodiment, as illustrated in FIG. 6, there are disposed a plurality of separators 8 between the cells 1. The separators 8 are adapted to separate between the fuel electrodes 3 and the oxygen electrodes 4, the electrodes which are different from each other. Further, there are formed fuel supply passages 80 and oxygen supply passages 82 by the separators 8. The fuel supply passages 80 communicate with an external fuel supply source (e.g., a hydrogen gas source) while the oxygen supply passages 82 communicate with an external oxygen supply source (e.g., the outside air). Further, there are formed fuel discharge passages 86 and oxygen discharge passages 87 by the separators 8. The fuel discharge passages 86 communicate with an external fuel collector device (e.g., a hydrogen collector device) while the oxygen discharge passages 87 communicate with the outside air.

Figure 12:
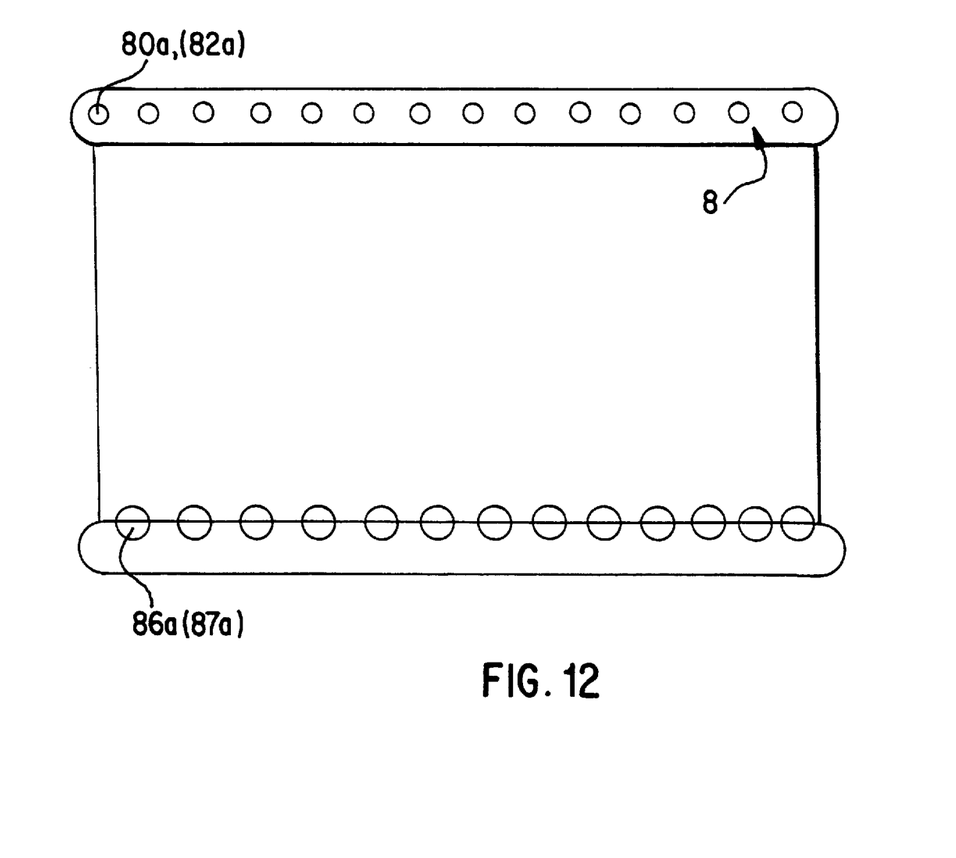
FIG. 12 is an outline view of the divergent passage of the fuel supply passage and the divergent passage of the oxygen discharge passage of the present invention.

The fuel supply passages 80 have five divergent passages 80a to introduce hydrogen for the polymer film 2. As shown in FIG. 12, the divergent passages 80a are located at the upper side of each cell 1 and are spaced to be spread across whole area of upper side of each cell 1. Also, the oxygen supply passages 82 have five divergent passages 82a to introduce oxygen for the polymer film 2. The divergent passages 82a are located at the upper side of each cell 1, and are spaced to spread them across the whole area of the upper side of each cell 1.

The fuel discharge passages 86 have five divergent passages 86a to discharge hydrogen from the polymer film 2. As shown in FIG. 12, each divergent passage 86a is located at the lower side of each cell 1, and is spaced to spread them across the whole area of the lower side of each cell 1. Also, the oxygen discharge passages 87 have five divergent passages 87a to discharge oxygen from the polymer film 2. As shown in FIG. 12, each divergent passage 87a is located at the lower side of each cell 1, and is spaced to spread them across the whole area of the lower side of each cell 1.

Figure 7:
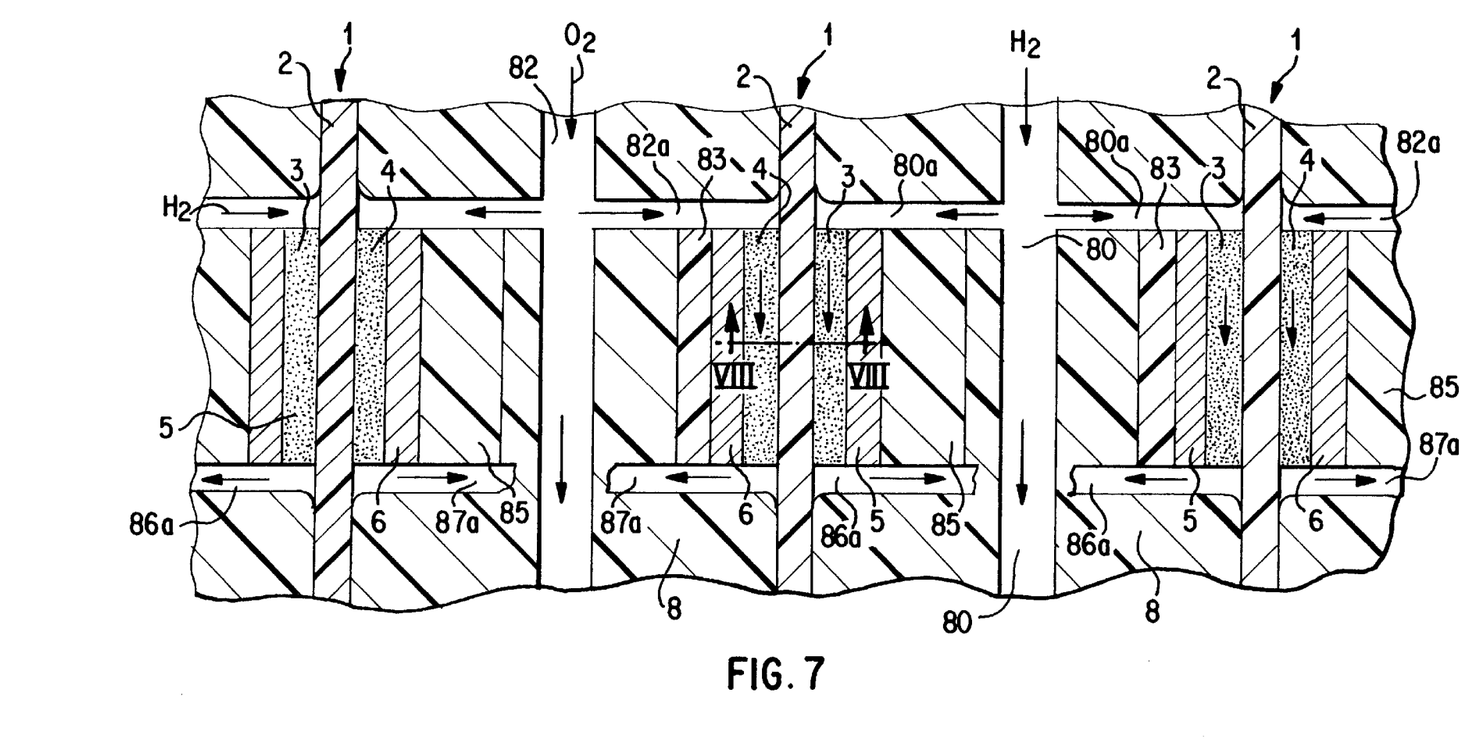
FIG. 7 is an enlarged schematic cross-sectional view of major portions of the present fuel cell.

As shown in FIG. 7, the fuel electrodes 3 of the neighboring cells 1 are disposed so as to face each other with respect to the fuel supply passages 80. Likewise, the oxygen electrodes 4 of the neighboring cells 1 are disposed so as to face each other with respect to the oxygen supply passages 82. On the other hand, the same electrodes (e.g., fuel electrodes 3) are disposed on both sides of the fuel supply passages 80 in the laminating direction of the cell 1. Likewise, the same electrodes (e.g., oxygen electrodes 4) are disposed on both sides of the oxygen supply passages 80 in the laminating direction of the cell 1. Further, thin resin sheets 83 which absorb changes in dimensional sizes are laminated between the separators 8 and the electrode collector plates 5, 6.

Figures 8, 9:
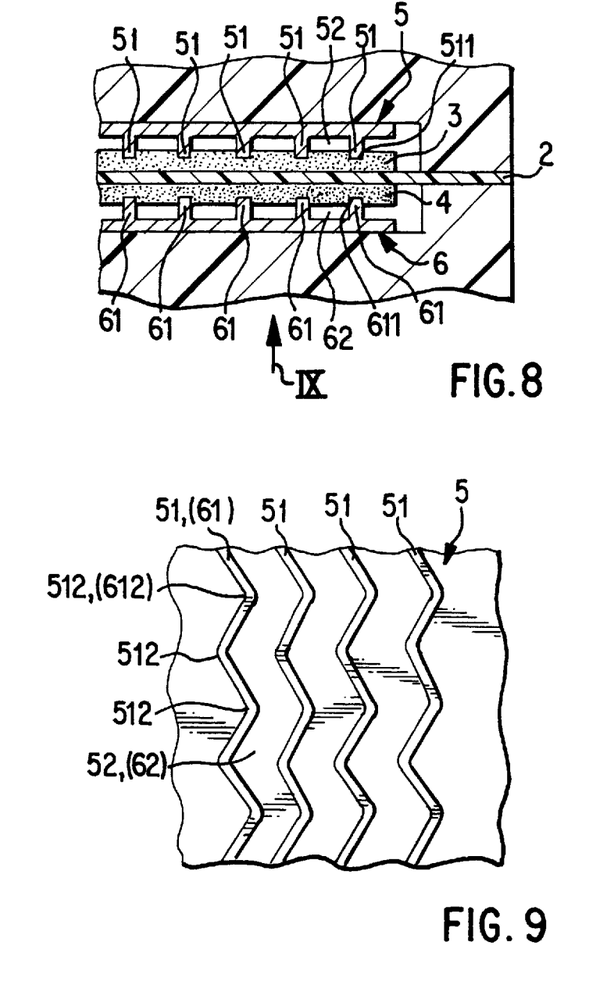
FIG. 8 is a cross-sectional view taken along the section line VII—VII in FIG. 7.
FIG. 9 is a perspective view as seen from the arrow IX—IX in FIG. 8.

FIG. 8 and FIG. 9 show the structure depicting how the electrode collector plates contact the electrodes. In FIG. 8, there are formed a plurality of projecting portions (first projecting portions) 51 extending from the surface of the fuel electrode electricity collector plates 5 which face the fuel electrodes 3. In addition, fuel passages 52 are formed and are defined by the space enclosed between the fuel electrode 3, the fuel electrode collector plate 5 and two neighboring first projecting portions 51. The fuel passages 52 communicate with the fuel supply passages 80 to introduce fuel therein. The fuel electrode electricity collector plates 5 and fuel electrodes 3 are integrated with one another by pressing, such as hot-pressing. The top or distal end 511 of the first projecting portions 51 intrude into and penetrate the fuel electrodes 3 (i.e., they extend below the plane defined by the outer surface of the fuel electrodes 3). As described below, the fuel electrode electricity collector plates 5 are made of copper, and the fuel electrodes 3 are made of carbon which is softer than copper. Thus, the tops 511 of the first projecting portions 51 intrude into or penetrate the surface of the fuel electrodes 3 more easily.

Further, as shown in FIG. 9, the first projecting portions 51 possess a wave-like or non-linear shape with respect to the length-wise direction of the portions 51. On the other hand, there are a plurality of curved portions 512 in the first projecting portions 51 to increase the substantial length of the fuel electrode electricity collector plates 5. Thus, the length of the fuel passages 52 is also increased. Hence, as seen in FIG. 9, the fuel passages 52 and the fluid flow path through each of the fuel passages 52 are non-linear.

As seen in FIG. 8, there are a plurality of projecting portions (second projecting portions) 61 extending from the surface of the oxygen electrode electricity collector plates 6 which face the oxygen electrodes 4. A plurality of oxygen passages 62 are thus formed, each defined by the space enclosed between the oxygen electrode 4, the oxygen electrode electricity collector plate 6, and two neighboring second projecting portions 61. These oxygen passages 62 communicate with the oxygen supply passages 82 to introduce oxygen therein. The oxygen electrode electricity collector plates 6 and the oxygen electrodes 4 are integrated with one another by pressing, such as hot-pressing. The tops or distal ends 611 of the second projecting portions 61 intrude into and penetrate the oxygen electrodes 4 (i.e., the tops 611 extend below the plane defined by the outer surface of the oxygen electrodes 4). As described below, the oxygen electrode electricity collector plates 6 are made of copper, and the oxygen electrodes 4 are made of carbon. Thus, the top 611 of the second projecting portions 61 can intrude into the oxygen electrodes 4 relatively easily.

Further, as shown in FIG. 9, the second projecting portions 61 possess a wave-like or non-linear shape with respect to the length-wise direction of the projecting portions 61. There is also a plurality of curved portions 612 in the second projecting portions 61 for purposes of increasing the length of the oxygen electrode electricity collector plates 6. Thus, the lengths of the oxygen passages 62 are also increased. Hence, as seen in FIG. 9, the oxygen passages 62 and the fluid flow path through each of the oxygen passages 62 are non-linear.

Figure 10:
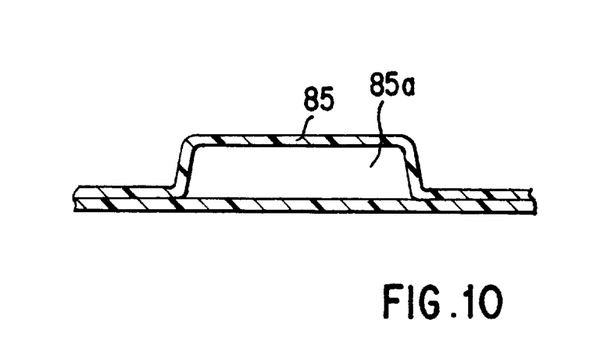
FIG. 10 is a schematic cross-sectional view of a major portion in a coolant circuit of the present fuel cell.
Figure 11:
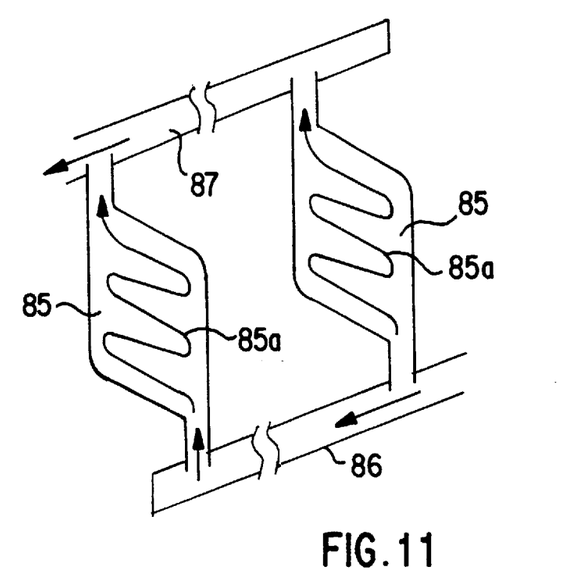
FIG. 11 is a schematic construction diagram of a coolant supply circuit of the present fuel cell.

As shown in FIG. 7, the cooling members 85 are disposed in the separators 8 in each cell 1. As shown in FIG. 10, each cooling member 85 is formed by two laminated resin sheets and coolant passages 85a formed between the two laminated resin sheets. Further, as shown in FIG. 11, each cooling member communicates with an inlet tube 86 and an outlet tube 87 into the fuel cell.

When coolant is supplied into the coolant passage 85a of the cooling members 85, the pressure within the coolant passage 85a increases so that the fuel electrode electricity collector plates 5 are urged towards the fuel electrodes 3 and the oxygen electrode electricity collector plates 6 are urged toward the oxygen electrode 4. The pressure can be determined as desired, for example in a range of from 1.5 to 3 kgf/cm$^2$. Thus, the pressure increment reliably provides conductibility between the fuel electrode electricity collector plates 5 and the fuel electrode 3, and between the oxygen electrode electricity collector plates 6 and the oxygen electrodes 4. The cooling members 85 can be disposed in the neighborhood of the fuel electrode electricity collector plates 5 and the oxygen electrode electricity collector plates 6.

Figure 13:
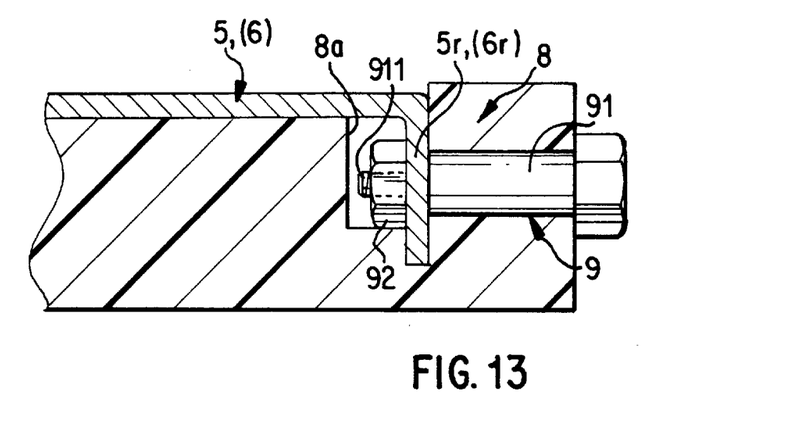
FIG. 13 is a cross-sectional view of a major portion of the fixed structure between a convex lug of an electricity collector and a separator.

FIG. 13 illustrates a fixed structure between the electricity collector plate 5 (the oxygen electrode electricity collector plate 6) and the separator 8. In FIG. 13, the projecting lug 5r (6r) of the electricity collector plate 5 (the oxygen electrode electricity collector plate 6) is fixed with the separator 8 by a fixing member 9. There is a concave portion 8a provided in the separator 8, and the projecting lug 5r (6r)

of the electricity collector plate 5 (the oxygen electrode electricity collector plate 6) and a part of the fixing member 9 are accommodated in the concave portion 8*a*.

The fixing member 9 consists of a male screw 91 having a small diameter portion 911 accommodated in the concave portion 8*a* and a female screw or nut 92 screwed with the small diameter portion 911. The projecting lug 5*r* (6*r*) is sandwiched between the male screw 91 and female screw or nut 92. The projecting lug 5*r* (6*r*) has a cutting portion (unshown) which opens downwardly and into which the small diameter portion 911 is inserted. The male screw 91 and the female screw or nut 92 are made of copper and connected with the conductive wire as shown in FIG. 4.

The method of fixing the electricity collector plate 5 (6) with the separator 8 is follow. First, the female screw or nut 92, in the concave portion 8*a* is screwed loose onto the male screw 91. After that, the projecting lug 5*r* (6*r*) is inserted between the male screw 91 and the female screw or nut 92, and the female screw is then screwed tight with the male screw 91 until the female screw 92 can no longer be rotated. Thus, even though the female screw 92 is not disposed on the concave portion 8*a* (i.e., the female screw 92 is suspended), the electricity collector plate 5 can be readily fixed with the separator 8.

As described above, in the present invention, the shape of the first projecting portions 51 of the fuel electrode electricity collector plates 5 used as the wall of the fuel passages 52 and the shape of the second projecting portions 61 of the oxygen electrode electricity collector plates 6 used as the wall of the oxygen passages 62 are wave-shaped with respect to their length-wise direction. Thus, the lengths of the projecting portions are longer than the length of the projecting portions that are bar-shaped in the length-wise direction. As a result, the contacting area between the projecting portions 51 and the fuel electrodes 3, and between the projecting portions 61 and the oxygen electrodes 4 are broader than in the conventional fuel cell. Thus, the electrical resistance between the electricity collector plates 5 (6) and the electrode 3 (4) is much smaller, thereby resulting in improvement in the electrical collectability.

Further, the first projecting portions 51 intrude into the fuel electrodes 3 and the second projecting portions 61 intrude into the oxygen electrodes 4. Consequently, the electrodes 3, 4 contact all portions 4 of the projecting portions 51, 61 that intrude into the electrodes 3, 4. As a result, the contacting area between the projecting portions 51, 61 and the electrodes 3, 4 of the fuel cell according to the present invention are broader than that of the conventional fuel cell. Thus, the electrical resistance between the electricity collector plates 5 (6) and the electrodes 3 (4) is much smaller, thereby contributing to improvement of the electrical collectability.

Also, the fuel electrode electricity collector plates 5 (the oxygen electrode electricity collector plates 6) are urged towards the fuel electrodes 3 (the oxygen electrodes 4) by the pressure that occurs when coolant is supplied in each of the coolant passages 85*a* of the cooling member. So the fuel electrode electricity collector plates 5 (the oxygen electrode electricity collector plates 6) contact the fuel electrodes 3 (the oxygen electrodes 4) more strongly. As a result, the electrical resistance between the electricity collector plates 5 (6) and the electrodes 3 (4) is much smaller to thereby further contribute to improvement of the electrical collectability.

Additionally, there exits the cooling member 85 having the coolant passages 85*a* in each cell 1, so the affect of reducing the electrical resistance and the affect of improving electrical collectability are expected in each cell 1. Furthermore, the cooling efficiency in the polymer-film type fuel cell can be improved.

Further, five electrodes are laminated on both surfaces of the polymer film 2. On the other hand, five sets of batteries are formed on one polymer film 2. Thus, the voltage created on one polymer film 2 is higher which is advantageous in a high voltage fuel cell.

Further, the same kind of electrodes are disposed in neighboring cells 1 so as to sandwich the separator 8 therebetween and face each other. This means that the thickness of the fuel supply passages 80 and the oxygen supply passages 82 is even secured though the thickness of the polymer-film type fuel cell is thinned. Thus, the structure for supplying fuel and oxygen via the fuel supply passages 80 and the oxygen supply passages 82 can be more easily provided.

Moreover, because the same kind of electrodes are disposed in neighboring cells 1 so as to sandwich the separator therebetween and face each other, it is possible to avoid a situation in which if the separator 8 is damaged, different kinds of electrodes of the neighboring cell 1 are electrically connected. Consequently, a short-circuit can be avoided. As a result, it is an advantage to secure the necessary electricity in the fuel cell. Furthermore, there are the same kinds of supply passages (only fuel passages or only oxygen passages) in one separator 8. Thus even if the separator 8 is damaged, the mixing of hydrogen with oxygen can be avoided.

Further, a plurality of divergent passages 80*a* (82*a*) for introducing fuel (oxygen) towards the polymer film 2 is formed in the whole upper side of each cell 1, and a plurality of divergent passages 86*a* (87*a*) for discharging fuel (oxygen) from the polymer film 2 is formed in the whole lower side of each cell 1. This makes it possible to introduce hydrogen (oxygen) towards the polymer film directly and to supply hydrogen (oxygen) for the whole area of the polymer film 2 homogeneously. As a result, the reaction is promoted and an output power of the cell is improved by homogeneous reaction.

In addition, the electricity collector plates 5 (6) have projecting lugs 5*r* (6*r*), and the projecting lugs 5*r* (6*r*) are fixed with the separator 8 by the fixed members 9. Thus, a hydrogen leak to the outside can be avoided.

In the embodiment of the present invention described above, the first cell includes five electrodes laminated on both surfaces of the polymer film 2. However, the number of electrodes laminated on both surfaces of the polymer film 2 is not so limited, and it is considered that the number of electrodes can be determined and varied as desired, such as one, two, three, four, or six or more electrodes.

Further in the present embodiment, though the polymer film 2 is selected as the solid electrolyte material, the invention is not so limited. All solid electrolyte material used for fuel cells can be used.

Also, although hydrogen is selected as fuel in the present embodiment, it is to be understood that the present invention is not so limited. CO as fuel can also be used for the present invention.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fuel cell comprising:

a sheet-shaped solid electrolyte which has first and second opposite surfaces and which exhibits ion conductivity;

a fuel electrode to which is to be supplied fuel working as a negative electrode active material, said fuel electrode having first and second opposite surfaces, said fuel electrode being disposed on the first surface of said solid electrolyte so that the first surface of said fuel electrode faces the first surface of said solid electrolyte;

an oxygen electrode to which is to be supplied oxygen working as a positive electrode active material, said oxygen electrode having first and second opposite surfaces, said oxygen electrode being disposed on the second surface of said solid electrolyte so that the first surface of said oxygen electrode faces the second surface of said solid electrolyte;

a fuel electrode electricity collector having a plurality of first projecting portions in contact with said fuel electrode;

an oxygen electrode electricity collector having a plurality of second projecting portions in contact with said oxygen electrode;

a plurality of fuel passages through which fuel is to be passed, each fuel passage being formed by a space bounded by said fuel electrode, said fuel electrode electricity collector and two side-by-side first projecting portions;

a plurality of oxygen passages through which oxygen is to be passed, each oxygen passage being formed by a space bounded by said oxygen electrode, said oxygen electrode electricity collector and two side-by-side second projecting portions;

at least one of said first projecting portions or one of said second projecting portions having a curved portion; and at least one of said first projecting portions penetrating and extending below the second surface of the fuel electrode or at least one of said second projecting portions penetrating and extending below the second surface of the oxygen electrode.

2. A fuel cell as set forth in claim 1, wherein at least one of said first projecting portions penetrates and extends below the second surface of the fuel electrode and at least one of said second projecting portions penetrates and extends below the second surface of the oxygen electrode.

3. A fuel cell as set forth in claim 2, wherein said first projecting portions and said second projecting portions are wave-shaped.

4. A fuel cell as set forth in claim 1, including a cooling member positioned adjacent at least one of said fuel electrode electricity collector and said oxygen electrode electricity collector.

5. A fuel cell comprising:

a plate-shaped solid electrolyte which has first and second opposite surfaces and which exhibits ion conductivity;

a fuel electrode to which is to be supplied fuel working as a negative electrode active material, said fuel electrode having first and second opposite surfaces, said fuel electrode being disposed on the first surface of said solid electrolyte so that the first surface of said fuel electrode faces the first surface of said solid electrolyte;

an oxygen electrode to which is to be supplied oxygen working as a positive electrode active material, said oxygen electrode having first and second opposite surfaces, said oxygen electrode being disposed on the second surface of said solid electrolyte so that the first surface of said oxygen electrode faces the second surface of said solid electrolyte;

a fuel electrode electricity collector positioned in facing relation to said fuel electrode;

an oxygen electrode electricity collector positioned in facing relation to said oxygen electrode;

at least one fuel passage through which fuel is to be passed, said at least one fuel passage being defined by a space that is bounded by said fuel electrode, said fuel electrode electricity collector and two first projecting portions extending from the fuel electrode electricity collector towards the fuel electrode, said first projecting portions penetrating and extending below an outer surface of the fuel electrode;

at least one oxygen passage through which oxygen is to be passed, said at least one oxygen passage being defined by a space that is bounded by said oxygen electrode, said oxygen electrode electricity collector and two second projecting portions extending from the oxygen electrode electricity collector towards the oxygen electrode, said second projecting portions penetrating and extending below an outer surface of the oxygen electrode;

at least one of said oxygen passage and said fuel passage having a non-linear shape to provide a non-linear fluid flow path.

6. A fuel cell comprising:

a plate-shaped solid electrolyte which has first and second opposite surfaces and which exhibits ion conductivity;

a fuel electrode to which is to be supplied fuel working as a negative electrode active material, said fuel electrode having first and second opposite surfaces, said fuel electrode being disposed on the first surface of said solid electrolyte so that the first surface of said fuel electrode faces the first surface of said solid electrolyte;

an oxygen electrode to which is to be supplied oxygen working as a positive electrode active material, said oxygen electrode having first and second opposite surfaces, said oxygen electrode being disposed on the second surface of said solid electrolyte so that the first surface of said oxygen electrode faces the second surface of said solid electrolyte;

a fuel electrode electricity collector having first and second oppositely positioned outer surfaces with at least two first projecting portions extending from the fuel electrode electricity collector and being in contact with the fuel electrode to define a fuel passage through which fuel is to be passed, the fuel passage being bounded by said fuel electrode, said first surface of the fuel electrode electricity collector and said two first projecting portions;

an oxygen electrode electricity collector having first and second oppositely positioned outer surfaces with at least two second projecting portions extending from the oxygen electrode electricity collector and being in contact with the oxygen electrode to define an oxygen passage through which oxygen is to be passed, said oxygen passage being bounded by said oxygen electrode, said oxygen electrode electricity collector and said second projecting portions; and said first and second projecting portions having a distal end, the first and second projecting portions being positioned such that: 1) the distal end of at least one of said first projecting portions penetrates and extends below the second surface of the fuel electrode; or 2) the distal end of at least one of said second projecting portions penetrates or extends below the second surface of the oxygen electrode.

7. A fuel cell as set forth in claim 6, wherein said first projecting portions are non-linear with respect to a lengthwise direction of the first projecting portions and said second projecting portions are non-linear with respect to a lengthwise direction of the second projecting portions.

8. A fuel cell as set forth in claim 6, including a cooling member positioned adjacent at least one of said fuel electrode electricity collector and said oxygen electrode electricity collector.

9. A fuel cell as set forth in claim 8, wherein said cooling member is positioned adjacent said fuel electrode electricity collector and includes two laminated sheets between which is defined a coolant passage through which coolant is to flow, coolant flow through the coolant passage urging said fuel electrode electricity collector towards the fuel electrode.

10. A fuel cell as set forth in claim 8, wherein said cooling member is positioned adjacent said oxygen electrode electricity collector and includes two laminated sheets between which is defined a coolant passage through which coolant is to flow, coolant flow through the coolant passage urging said oxygen electrode electricity collector towards the oxygen electrode.

11. A fuel cell comprising:

a sheet-shaped solid electrolyte which has first and second opposite surfaces and which exhibits ion conductivity;

a fuel electrode to which is to be supplied fuel working as a negative electrode active material, said fuel electrode having first and second opposite surfaces, said fuel electrode being disposed on the first surface of said solid electrolyte so that the first surface of said fuel electrode faces the first surface of said solid electrolyte;

an oxygen electrode to which is to be supplied oxygen working as a positive electrode active material, said oxygen electrode having first and second opposite surfaces, said oxygen electrode being disposed on the second surface of said solid electrolyte so that the first surface of said oxygen electrode faces the second surface of said solid electrode;

a fuel electrode electricity collector having a plurality of first projecting portions in contact with said fuel electrode;

an oxygen electrode electricity collector having a plurality of second projecting portions in contact with said oxygen electrode;

a plurality of fuel passages through which fuel is to be passed, each fuel passage being formed by a space bounded by said fuel electrode, said fuel electrode electricity collector and two side-by-side first projecting portions;

a plurality of oxygen passages through which oxygen is to be passed, each oxygen passage being formed by a space bounded by said oxygen electrode, said oxygen electrode electricity collector and two side-by-side second projecting portions; and at least one of said first projecting portions penetrating and extending below the second surface of the fuel electrode or at least one of said second projecting portions penetrating and extending below into the second surface of the oxygen electrode.

\* \* \* \* \*